United States Patent [19]

Masuda

[11] Patent Number: 5,028,214
[45] Date of Patent: Jul. 2, 1991

[54] FLOW METERING DEVICE FOR CONTROLLING THE DISPLACEMENT OF A VARIABLE CAPACITY PUMP BY DETECTING THE FLOW RATE

[75] Inventor: Kenji Masuda, Settsu, Japan

[73] Assignee: Daikin Industries, Ltd., Osaka, Japan

[21] Appl. No.: 559,263

[22] Filed: Jul. 27, 1990

Related U.S. Application Data

[62] Division of Ser. No. 251,219, Aug. 8, 1988, Pat. No. 4,969,364.

[30] Foreign Application Priority Data

| Dec. 8, 1986 | [JP] | Japan | 61-291960 |
| Dec. 23, 1986 | [JP] | Japan | 61-310415 |
| Jan. 21, 1987 | [JP] | Japan | 62-12781 |
| Feb. 6, 1987 | [JP] | Japan | 62-26539 |
| Feb. 7, 1987 | [JP] | Japan | 62-26728 |

[51] Int. Cl.$^5$ .............................................. F04B 49/08
[52] U.S. Cl. .............................................. 417/218
[58] Field of Search .............. 417/218, 219, 220, 221, 417/222; 73/861.71, 861.72

[56] References Cited

U.S. PATENT DOCUMENTS

| 1,401,299 | 12/1921 | Wohlenberg | 73/861.71 |
| 2,804,771 | 9/1957 | Brown | 73/861.72 |
| 3,017,750 | 1/1962 | Kempson | 417/218 |
| 3,051,092 | 8/1962 | Lambeck | 417/219 |
| 3,408,865 | 11/1958 | Chenault | 73/861.54 |
| 3,584,508 | 6/1971 | Shiba | 73/861.72 |
| 3,953,819 | 4/1976 | Keerie et al. | |
| 4,245,962 | 1/1981 | Uehara et al. | 417/218 |
| 4,378,200 | 3/1983 | Edwards et al. | 417/218 |
| 4,522,565 | 7/1985 | Stockton | 417/219 |
| 4,569,232 | 2/1986 | Kim | |
| 4,601,641 | 7/1986 | Kuroyahagi | 417/219 |
| 4,699,571 | 10/1987 | Bartholomaus | 417/218 |
| 4,781,070 | 11/1988 | Derin | 73/861.72 |

FOREIGN PATENT DOCUMENTS

| 61-41923 | 2/1986 | Japan . |
| 8420882 | 8/1984 | United Kingdom . |

Primary Examiner—Leonard E. Smith
Assistant Examiner—M. Kocharov

[57] ABSTRACT

A flow metering device designed to variably control the discharge from a variable displacement pump by detecting changes in momentum of the flowing fluid, which are proportional to the mass flow rates. The rate of discharge from the pump is then accurately controlled to a prescribed rate without being influenced by changes in viscosity of the fluid or where cavitation, bubbling, or the like occurs in the flow.

3 Claims, 2 Drawing Sheets $$F = \rho \cdot Q (V_1 \cos\theta_1 - V_2 \cos\theta_2)$$

FLOW METERING DEVICE FOR CONTROLLING THE DISPLACEMENT OF A VARIABLE CAPACITY PUMP BY DETECTING THE FLOW RATE

This application is a divisional of application Ser. No. 251,219, filed on Aug. 8, 1988, now U.S. Pat. No. 4,969,364.

FIELD OF THE INVENTION

The present invention relates to a hydraulic apparatus using a flowmeter.

BACKGROUND OF THE INVENTION

It is an object of the present invention to provide a hydraulic apparatus which is designed to variably control the discharge from a variable displacement pump by detecting changes in momentum of the flowing fluid, which are proportional to the mass flow rates, so that the rate of discharge from the type of pump will be accurately controlled to a prescribed rate without being influenced by changes in viscosity of the fluid or where cavitation, bubbling, or the like occurs in the flow.

The principle on which this invention is based will now be explained with reference to FIG. 1 hereunder.

The force F which acts on a control surface S can be reduced to a formula

F=(momentum of the fluid flowing into the control surface S)−(momentum of the fluid flowing out of the control surface S)

With $\theta_1$ as the inflow angle which the fluid makes with respect to a certain direction as it flows into the control surface S, $\theta_2$ as the outflow angle which the fluid makes with respect to said certain direction as it flows out of the control surface, $V_1$ as the velocity at which the fluid flows into the control surface S, $V_2$ as the velocity at which the fluid flows out of the control surface S, and Q as the quantity of the fluid which flows into and out of the control surface S, the above-mentioned formula regarding momentums in said certain direction of the control surface S can be developed into an equation:

$$F = \rho \cdot Q(V_1 \cos\theta_1 - V_2 \cos\theta_2) + \rho \cdot L \cdot \dot{Q} + F\tau + \alpha$$

wherein
$\rho$ represents the density of the flowing fluid,
L: a damping length (a component in said certain direction of the distance between the inflow and outflow of the flowing fluid in the control surface),
$\dot{Q}$: dQ/dt,
$F\tau$: a viscous, frictional force generated between the flowing fluid and the inner surfaces within the control surface as the fluid flows past them,
$\alpha$: a transient force required to accelerate an object as a whole when the object, surrounded by the control surface, is moved by a force applied by the flowing fluid.

Since, ordinarily the term $(\rho \cdot L \cdot \dot{Q} + F\tau + \alpha)$ represents so small a value as to be negligible as compared with the term $\rho \cdot Q (V_1 \cos\theta_1 - V_2 \cos\theta_2)$, the above formula can be reduced to an equation $$F = \rho \cdot Q (V_1 \cos\theta_1 - V_2 \cos\theta_2) \quad (1)$$

With $A_1$ as the cross-sectional area of the inflow opening for leading the fluid into said control surface S and $A_2$ as the cross-sectional area of the outflow opening for leading the fluid out of the control surface S, and considering $V_1 = Q/A_1$ and $V_2 = -Q/A_2$, the equation (1) can be developed into an equation $$F = \rho \cdot Q \left( \frac{Q}{A_1} \cos\theta_1 + \frac{Q}{A_2} \cos\theta_2 \right) \quad (2)$$

which, considering $\theta_1 = \theta_2 = \theta$ and $A_1 = A_2 = A$, can further be developed into an equation $$\begin{aligned} F &= 2\cos\theta \cdot \frac{\rho}{A} \cdot Q^2 \\ &= 2\cos\theta \cdot \frac{(\rho \cdot Q)^2}{\rho \cdot A} \end{aligned} \quad (3)$$

Accordingly, the mass flow rate $(\rho \cdot Q)$ can be represented as a function of the force in a certain direction with $\theta$, A and $\rho$ as constants, so that a mass flow rate can be determined by measuring the force F which represents the flow rate.

As illustrated in FIG. 2, a hydraulic apparatus according to the present invention is composed of a variable displacement pump 571, a flow detective unit 501 and a means for setting a mass flow rate 561; said variable displacement pump 571 has a discharge control unit 572 for variably controlling the discharge rate by pressure of fluid; said flow detective unit 501 comprises a main body 502 having a cylindrical chamber 503a inside, a detective core 505 slidably fitted in the cylindrical chamber 503a, a spool 538 acting conjoinedly with the detective core 505 and designed to control the channel between an inlet port 532 and an outlet port 533, inflow passageways 517 bored in the main body 502 for leading flowing fluid into the detective core 505, and outflow passageways 513 bored in the detective core 505 for leading the flowing fluid brought in by the inflow passageways 517 to the main body 502, at least either the inflow passageways 517 or the outflow passageways 513 forming a certain angle of inclination with the axis of the detective core 505; the means for setting the mass flow rate 561 is designed to apply a set force to the detective core 505 and actuate the spool 538 so as to counterbalance the set force with a force produced by a change in momentum of the flowing fluid and acting on the detective core 505. The pressure line 585 extended from the variable displacement pump 571 is connected to the inflow passageways 517 at the flow detective unit 501 and also to the inlet port 532 by a pilot line 588, whereas the outlet port 533 is connected to the discharge control unit 572 by a line 591.

Flowing fluid supplied to the main body of the flow detective unit 501 is led at a certain inflow angle by the inflow passageways 517 in the main body into the detective core 505, then turned in its direction in the detective core 505, and led at a certain outflow angle by the outflow passageways 513 in the detective core 505 into the main body. Then, a change in momentum of the flowing fluid applies a force proportional to the mass flow to the detective core 505. The spool 538, joined with the detective core 505, is thereby moved to a position where the force proportional to the mass flow balances the force applied by the means for setting the mass flow rate 561 and thus controls the channel between the inlet port 532 and the outlet port 533. The opening of the channel between the discharge control unit 572 of the variable displacement pump 571 and the pressure line 585 or a tank 592 that results from the above-mentioned movement of the spool 538 actuates the discharge control unit 572 in its function to variably control the discharge rate of the variable displacement pump 571. Thus, on the basis of the mass flow, the discharge rate of the variable displacement pump 571 can be controlled in accordance with a prescribed rate with accuracy even where cavitation, bubbling, or the like occurs in the flow.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

The present invention will now be described in detail hereunder with respect to the embodiments shown by the drawings.

Figure 1:
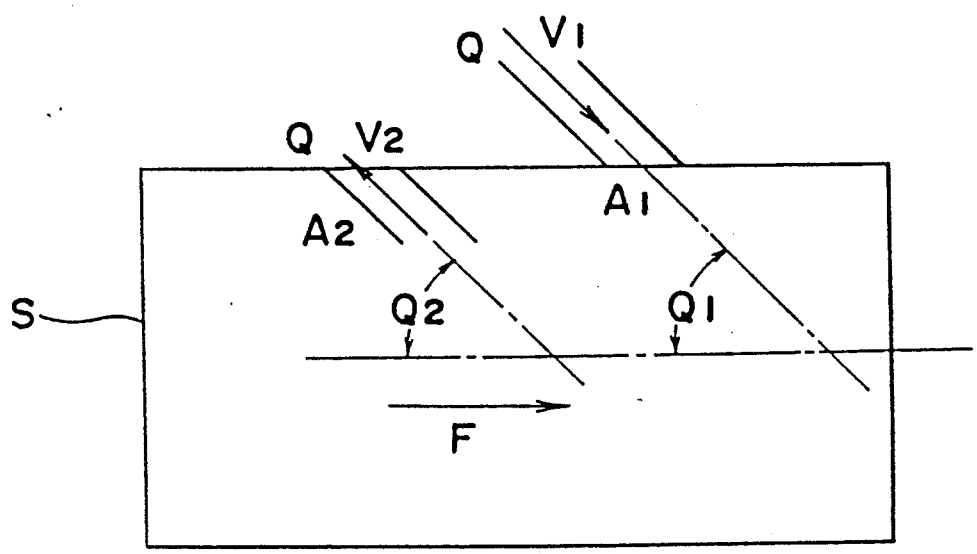
FIG. 1 diagrammatically describes the principle on which the flow rate is determined in the present invention.
Figure 2:
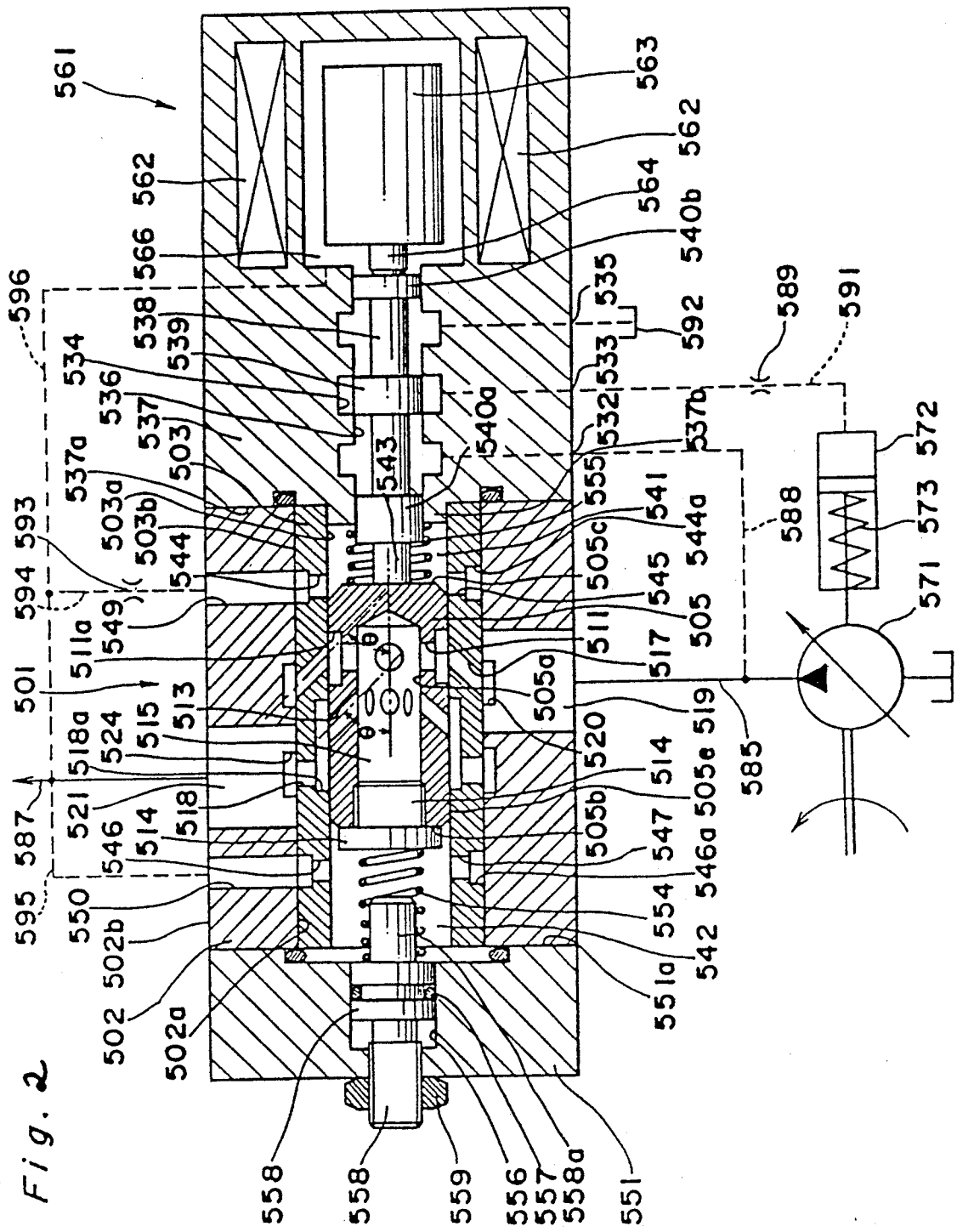
FIG. 2 is illustrative of a hydraulic apparatus in a cross-sectional representation as an embodiment of the present invention.

Referring to FIG. 2, there is shown a hydraulic apparatus as a seventh embodiment of the present, which consists primarily of a flow detective unit 501, a variable displacement pump 571, and a proportional solenoid 561 as a means for setting the mass flow rate.

Said flow detective unit 501 comprises a main body structure 502 having a cylindrical bore 502a in the axial direction, a sleeve 503 fitting in said cylindrical bore 502a, a detective core 505 which is cylindrical in shape and slidably fits in the bore 503a of the sleeve 503, and a spool 538 which is fixed to the detective core 505.

Said detective core 505 has a bore 505a axially opened from the end 505b (at the left in FIG. 2) of the detective core 505 and sealed with a detective core plug 514 screwed in at the opening so that a chamber 515 is formed in the detective core 505. The detective core 505 has in its circumferential surface 505e a circular groove 511a, which communicates with said chamber 515 by four bores 511, 511, ... opened each at an equal distance from each adjacent bore circumferentially. The detective core 505 furthermore has eight outflow passageways 513, 513, ... bored from the circumferential surface 505e to the chamber 515, each outflow passageway 513 being equally distant from each adjacent outflow passageway circumferentially and making an angle of $\theta$ with the axis of the detective core 505.

Said sleeve 503 has four inflow passageways 517, 517, ... bored from the circumferential surface 503b to the bore 503a each at an equal distance from each adjacent inflow passageway circumferentially. The inflow angle which each inflow passageway 517 makes with the axis of the detective core 505 is the same ($=\theta$) as the outflow angle of the outflow passageway 513. Each of these inflow passageways 517, 517, ... has the same sectional area as each outflow passageway 513. The sleeve 503 furthermore has a circular groove 518a in its inner surface 503a and eight bores 518, 518, ... opened from the circular groove 518a to the circumferential surface 503b each at an equal distance from each adjacent bore circumferentially.

The inflow port 519 and the outflow port 521 are opened in the main body structure 502. The main body structure 502 furthermore has in its inner surface 502a a circular groove 520 which connects the inflow port 519 with the four inflow passageways 517, 517, ... so that the flowing liquid entering the inflow port 519 is led into the inflow passageways 517, 517, .... Likewise, the main body structure 502 has a circular groove 524 which connects the bores 518, 518, ... in the sleeve 503 with the outflow port 521 so that the liquid flowing out by the outflow passageways 513, 513, ... is discharged by the outflow port 521.

Adjacently to (at the right in FIG. 2) the flow detective unit 501 is disposed a housing 537 interiorly having a valve chamber 536 which is cylindrical in shape and communicates with an entry port 532, exit port 533, and discharge port 535. The housing 537 having a circular edge 537b projecting from one end surface 537a (at the left in FIG. 2) is joined to the main body structure 502 by fitting said circular edge 537b into the bore 503a of the sleeve 503 and fastened together by bolting or the like (not shown in the drawing). In said valve chamber 536 is slidably fitted a spool 538 having a land 539 which opens and shuts a passageway between the exit port 533 and the entry port 532 and another between the exit port 533 and the discharge port 535. The land 539 has no lap when positioned facing the circular groove 534 which communicates with the exit port 533. The spool 538 has at one end a land 540b and at the other end a land 540a, the latter land being fixed to the end 505c (at the right in FIG. 2) of the detective core 505 by a joining means 543 so that the spool 538 moves together with the detective core 505 as one body.

Said proportional solenoid 561 consists of an electromagnetic coil 562 and a movable iron core 563. The end of the axial rod 564 projecting from the movable iron core 563 is in contact with the end surface of the land 540b of the spool 538 so that, when the electromagnetic coil 562 is excited, the movable iron core 563 applies to the spool 538 a force (to the left in FIG. 2) proportional to the impressed current for the excitation.

An end cover 551 is fixed to one end of the main body structure 502 by bolting (not shown in the drawing). In the middle of the end cover 551 is axially bored a stepped hole 556, into which is fitted an end cover plug 558 having a projection 558a projecting into a chamber 542 (at the left in FIG. 2) opened to said detective core plug 514 and fixed thereto with a locknut 559. An O-ring 557 is used for sealing between said stepped hole 556 and end cover plug 508. A first spring 554 is placed under compression between the end cover plug 558 and the detective core plug 514, and a second spring 555 is placed under compression between the end 505c (at the right in FIG. 2) of the detective core 505 and the circular edge 537b projecting from the housing 537, so that, when the flow detective unit 501 is not in operation, the detective core 505 is placed at the neutral position under the balancing forces of the first spring 554 and the second spring 555 and, when the detective core 505 moves within a certain range, the connection between each inflow passageway 517 and the circular groove 511a of the detective core 505 is maintained.

Said sleeve 503 has bores 544, 545 by which the chamber 541 (at the right in FIG. 2) defined on one side by the end surface 505c (at the right in FIG. 2) of the detective core 505 communicates with the outside of the sleeve 503 at all times, and in its circumferential surface 503b a circular groove 544a with which the bores 544, 545 are connected. The sleeve 503 has bores 546, 547 which are at all times open into the chamber 542 (at the left in FIG. 2) defined by the end surface of the detective core plug 514, and in its circumferential surface 503b a circular groove 546a which is connected with the bores 546, 547. The main body structure 502 has communicating bores 549, 550, the bore 549 being connected with the circular groove 544a and the bore 550 with the circular groove 546a so that both the chambers 541 (at the right in FIG. 2) and 542 (at the left) communicate with outside equipment.

Said variable displacement pump 571 variably controls the discharge under the pressure of liquid. For example, one such pump is equipped with a discharge control unit 572 consisting of a swash-plate control cylinder. When no pressure of liquid is acting, the discharge control unit 572 sets the variable discharge pump 571 for the maximum discharge under the force of the spring 573.

The discharge port of the variable displacement pump 571 is connected to the inflow port 519 of said flow detective unit 501 by a pressure line 585, and the outflow port 521 is connected with a main line 587. Said entry port 532 is connected to the pressure line 585 by a pilot line 588. Said exit port 533 is connected to the no-spring end of the discharge control unit 572 by a pilot line 591 having a restrictor 589. Said discharge port 535 is connected to a tank 592.

Said communicating bore 549 formed in the main body structure 502 is connected to the main line 587 by a line 594 having a restrictor 593 and the other communicating bore 550 is also connected to the same main line passageway 587 by a line 595 so that drain produced in the chambers 541, 542 of the flow detective unit 501 is discharged into the main line passageway 587 by the bores 544, 545, 546, 547, circular grooves 544a, 546a, communicating bores 549, 550, and lines 594, 595. Said proportional solenoid 561 is of the oil-immersed type, a line 596 connecting its movable iron core chamber 566 to the line 594.

A hydraulic apparatus assembled as above operates as follows.

A flowing liquid supplied from said variable displacement pump 571 flows into the flow detective unit 501 by a pressure line 585. The liquid thence is led into the chamber 515 of the detective core 505 by the circular groove 520 in the main body structure 502, four inflow passageways 517, 517, ... in the sleeve 503, and circular groove 511a and the four bores 511, 511, ... in the detective core 505, and led out of the chamber 515 to the outflow port 521 by the eight outflow passageways 513, 513, ... in the detective core 505, circular groove 518a and eight bores 518, 518, ... in the sleeve 503, and circular groove 524 in the main body structure 502 and thence discharged.

Since the closed curved surfaces defined by the circumferential surface 505e and the two opposite ends 505b, 505c of the detective core 505 can be considered as a control surface, a change in the momentum which a flowing liquid undergoes inside the control surface as it flows into the control surface at a certain angle to the axis of the detective core 505 by the inflow passageways 517, 517, ... and flows out at a certain angle by the outflow passageways 513, 513, ... formed inside the control surface is equal to the force F which acts on the object (the detective core 505 in this instance) positioned inside the control surface, and the value of this force F can be obtained by the formula (2) already mentioned. In this embodiment as has been mentioned, the same value $\theta$ is used for the angle $\theta_1$ of inclination of each inflow passageway 517 and that $\theta_2$ of each outflow passageway, and the same value is used for the sectional area $A_1$ of the inflow opening and that $A_2$ of the outflow opening. Thence, as expressed by the formula (3), a flowing liquid, as it flows into the control surface including the circumferential surface 505e and flows out of it, causes a force F which is proportional to the mass flow rate of the flowing liquid to act on the detective core 505 in the axial direction. The circumferential surface of the detective core 505 which defines a part of said control surface means the cylindrical surface (which is equivalent to the inner surface 503a of the sleeve 503) of the detective core 505 which includes the surfaces 505e, 505e, ... being in contact with the inner surface 503a of the sleeve 503.

Coincidentally, a force from the proportional solenoid 561 acts on the detective core 505 in the direction opposed to that of the force F. Therefore, when the flow of the liquid flowing through the detective core 505 exceeds a set value, the force F acting on the detective core 505 increases with change in momentum of the flowing liquid, resulting in shift of the detective core 505 from the position where its force balances that of the proportional solenoid 561 to a position to the right (in FIG. 2) as against the opposing forces of the proportional solenoid 561 and the second spring 555. Then, the land 539 of the spool 538 opens a passageway between the entry port 532 and the exit port 533 so that the liquid supplied by the pilot line 588 is conveyed to the no-spring end of the discharge control unit 572 by the pilot line 591 having a restrictor 589. As a result, the swash-plate in the variable displacement pump 571 is moved in the direction for decreasing the discharge, thus decreasing the discharge of the variable displacement pump 571. In this manner the discharge of the variable displacement pump 571 is adjusted to a set rate corresponding to the impressed current for exciting the proportional solenoid 561. As a result of the decrease in the flow rate, the force F acting on the detective core 505 decreases with change in the momentum, causing the detective core 505 to resume the position of equilibrium where its force balances the force from the proportional solenoid 561.

Contrarily, when the flow of the liquid flowing through the detective core 505 falls below the set rate, the force which the flow of the liquid causes to act on the detective core 505 decreases. Then, the detective core 505 shifts from the position of equilibrium to a position to the left (in FIG. 2) under an outbalancing force from the proportional solenoid 561. As a result, the land 539 opens a passageway between the exit port 533 and the discharge port 535 so that the liquid in the no-spring end of the discharge control unit 572 is discharged into the tank 592 by the pilot line 591, causing the swash-plate of the variable displacement pump 571 to shift in the direction for increasing the discharge. The discharge rate of the variable displacement pump 571 can thus be increased and resume the set rate. The force F acting on the detective core 505 is increased as the momentum of the flowing liquid increases and consequently the detective core 505 resumes the position of equilibrium where its force balances the force from the proportional solenoid.

By repeating the processes described above, this hydraulic apparatus adjusts the flow of the liquid in the pressure line 585 in terms of mass flow rate to the set rate corresponding to the force which the proportional solenoid 561 is set to exert.

This hydraulic apparatus, being designed to control the discharge of the variable displacement pump 571 by detecting the mass flow rate by the detective core 505, is capable of variably controlling the discharge without being influenced by changes in viscosity of the liquid caused by changes in temperature and adjusting the discharge accurately to a set mass flow rate where cavitation, bubbling, or the like occurs in the flow. In the embodiment described above, the spool 538 has no lap, and the detective core 405 and the spool 538 are joined as one body so that a slight movement of the detective core 505 can actuate the discharge control unit 572 and thus good responsiveness is ensured.

In the embodiment above, a series of passageways comprising a circular groove 511a, bores 511, chamber 515, and outflow passageways 513 are formed in the detective core 505. The object of the present invention, however, can be accomplished where the mass flow rate of a flowing liquid is determined by detecting changes in the momentum which the liquid undergoes as it flows into a control surface including the circumferential surface 505e of the detective core 505 at a certain angle and flows out of it at a certain angle, and accordingly, the present invention does not necessarily require passageways to be formed in the detective core 505 in an embodiment. The detective core can be made in any shape, provided that it is capable of converting a change in momentum of flowing liquid into a force.

In the embodiment above, a sleeve 503 is interposed between the main body structure 502 and the detective core 505 wherein inflow passageways 517, 517, . . . , circular groove 518a and bores 518 for leading out the flowing liquid, and the like are formed. The present invention does not restrict its embodiments to this particular structure but permits the main body structure 502 itself to have the inflow passageways without using a sleeve 503. In the embodiment above, the same value is used for the inflow angle $\theta_1$ and for the outflow angle $\theta_2$ at which the flowing liquid flows into and out of the detective core 505 and the same value for the sectional area $A_1$ of the inflow opening and for that $A_2$ of the outflow opening. Nevertheless, the present invention permits the angle of either the inflow or the outflow to be oblique or to differ between the inflow and the outflow, and also permits the sectional area to differ between the inflow opening and the outflow opening.

In the embodiment above, the land 538a of the spool 538 has no lap. The present invention does not restrict its embodiments to this particular specification but permits the land to show overlap or underlap. The means for setting the mass flow rate is not restricted to a proportional solenoid but a hand lever working with a spring can be substituted in the practice of the present invention.

As will have become understood from the foregoing description, a hydraulic apparatus as an embodiment of the present invention consists primarily of a variable displacement pump having a discharge control unit which is capable of variably controlling the discharge rate under pressure of a liquid, a flow detective unit, and a means for setting the mass flow rate, and operates on a mechanism wherein a change in momentum of a flowing liquid is made to act as a force on the detective core in the flow detective unit, which is counteracted by a force from a means for setting the mass flow rate in such a manner as to actuate a spool joined to said detective core by the opposing forces so that the discharge control unit of the variable displacement pump is actuated to variably control the discharge. The rate of a discharge from the variable displacement pump can thus be variably controlled by detecting the mass flow rate of the liquid. Therefore, a discharge can be controlled accurately without being influenced by changes in viscosity of the liquid caused by changes in its temperature and a discharge can be regulated accurately to a set rate in the manner of variable control where cavitation, bubbling, or the like occurs in the flow. Since, in the practice of the present invention, the discharge from a variable displacement pump is variably controlled on the basis of mass flow detected by the flow detective unit and in quantities actually required in terms of mass flow, this embodiment also lends itself to minimizing the loss of energy.

The invention being thus described, it will be obvious that the same may not be varied in many ways. Such variations are not to be regarded as a departure from the spirit and scope of the invention, and all such modifications as would be obvious to one skilled in the art are intended to be included within the scope of the following claims.

What is claimed is:

1. A hydraulic apparatus comprising a variable displacement pump, a flow detective unit, and means for setting the mass flow rate, said variable displacement pump having a discharge control unit for variably controlling the discharge rate under pressure of fluid;

said flow detective unit comprising a main body structure having an interior, generally cylindrical chamber, a detective core having a longitudinal axis and being slidably fitted in said chamber, an entry port and an exit port, a spool which is connected to said detective core and controls the connection between the entry port and the exit port, inflow passageways formed in said main body structure for leading a flowing fluid into said detective core, and outflow passageways formed in said detective core for leading the fluid drawn in by said inflow passageways into said main body structure, at least either said inflow passageways or said outflow passageways being inclined with respect to the axis of said detective core;

said means for setting the mass flow rate comprising a mechanism which applies a set force to said detective core and actuates said spool by balancing force produced by changes in momentum of a flowing fluid and acting on said detective core; and a pressure line connected with said variable displacement pump being connected to the inflow passageways in the flow-detective unit and by a pilot line to said entry port, and a line connecting said exit port to said discharge control unit.

2. The hydraulic apparatus as claimed in claim 1, wherein both said inflow passageways and said outflow passageways are inclined with respect to the axis of the detective core in one direction.

3. The hydraulic apparatus as claimed in claim 1, wherein said means for setting the mass flow rate comprises a proportional solenoid which exerts a force proportional to current applied thereto.

* * * * *